United States Patent
Kwag (10) Patent No.: US 10,439,180 B2
(45) Date of Patent: Oct. 8, 2019

(54) BATTERY MODULE

(71) Applicant: Samsung SDI Co., Ltd., Yongin-si, Gyeonggi-do (KR)

(72) Inventor: No-Hyun Kwag, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 202 days.

(21) Appl. No.: 15/343,045

(22) Filed: Nov. 3, 2016

(65) Prior Publication Data

US 2017/0125757 A1     May 4, 2017

(30) Foreign Application Priority Data

Nov. 4, 2015 (KR) .................... 10-2015-0154639

(51) Int. Cl.
| | | |
|---|---|---|
| *H01M 2/10* | (2006.01) | |
| *H01M 2/20* | (2006.01) | |
| *H01M 2/26* | (2006.01) | |
| *H01M 10/42* | (2006.01) | |

(52) U.S. Cl.
CPC ......... *H01M 2/1077* (2013.01); *H01M 2/206* (2013.01); *H01M 2/26* (2013.01); *H01M 10/425* (2013.01); *H01M 2010/4271* (2013.01); *H01M 2220/20* (2013.01)

(58) Field of Classification Search
CPC .............. H01M 2/1077; H01M 2010/4271
See application file for complete search history.

(56) References Cited

U.S. PATENT DOCUMENTS

| | | | | |
|---|---|---|---|---|
| 2011/0097619 A1* | 4/2011 | Park | ............ | H01M 2/105 |
| | | | | 429/159 |
| 2011/0135970 A1* | 6/2011 | Han | ............ | H01M 2/204 |
| | | | | 429/7 |
| 2013/0342213 A1 | 12/2013 | Seol | | |
| 2014/0120392 A1* | 5/2014 | Ueno | ............ | H01G 11/76 |
| | | | | 429/90 |
| 2016/0043446 A1* | 2/2016 | Fritz | ............ | H01M 10/425 |
| | | | | 429/90 |

FOREIGN PATENT DOCUMENTS

| | | |
|---|---|---|
| JP | 2008-166209 A | 7/2008 |
| KR | 10-2014-0002846 A | 1/2014 |

* cited by examiner

*Primary Examiner* — Matthew J Merkling
(74) *Attorney, Agent, or Firm* — Knobbe Martens Olson & Bear LLP (57) ABSTRACT

A battery module is disclosed. In one aspect, the battery module includes a plurality of rechargeable batteries and a plurality of electrode tabs connecting the rechargeable batteries. The battery module also includes a connection board electrically connecting the electrode tabs and a connector connecting the connection board and a protection circuit board. According to some embodiments, a process for manufacturing the battery module is simplified and material costs are reduced.

20 Claims, 6 Drawing Sheets

BATTERY MODULE

CROSS-REFERENCE TO RELATED APPLICATION

This application claims priority to and the benefit of Korean Patent Application No. 10-2015-0154639 filed in the Korean Intellectual Property Office on Nov. 4, 2015, the entire contents of which are incorporated herein by reference.

BACKGROUND

Field

The described technology generally relates to a battery module.

Description of the Related Technology

Unlike a primary battery, a rechargeable battery can be repeatedly charged and discharged. Low-power rechargeable batteries are used for portable compact electronic devices such as mobile phones, lap top computers, and camcorders. High-power rechargeable batteries are widely used as a power source for driving a motor of a hybrid vehicle, etc.

Recently, a high power rechargeable battery that includes a non-aqueous electrolyte having high energy density has been developed. This high power battery includes a plurality of rechargeable batteries coupled in series in order to drive devices requiring a large amount of power, for example, motors such as for electric vehicles.

SUMMARY OF CERTAIN INVENTIVE ASPECTS

One inventive aspect relates to a battery module that has improved durability and can reduce manufacturing costs.

Another aspect is a battery module that can prevent durability from being weakened while an electrode tab and a protection circuit board are being connected and simplify a manufacturing process of a battery module.

Another aspect is a battery module that includes: a plurality of rechargeable batteries; a plurality of electrode tabs connecting the rechargeable batteries; a connection board electrically connecting the electrode tabs; and a connector connecting the connection board and the protection circuit board.

Insertion protrusions may protrude from the electrode tab to be fixed to the connection board.

The insertion protrusions may be welded to the connection board.

A plurality of insertion holes to which the insertion protrusions are inserted may be provided in the connection board.

The connector may include: a first connection portion provided in the protection circuit board; and a second connection portion provided in the connection board and connected to the first connection portion.

The first connection portion may include: fixing pins fixed to the protection circuit board by being inserted therein; and a first connection body connected to the fixing pins and protruded to a direction of the connection board.

A plurality of locking holes may be provided in the first connection body.

The second connection portion may include a second connection body electrically fixed to the connection board and electrically connected to the first connection body.

Fixing protrusions fixed to the locking holes by being locked therein may protrude from a side surface of the second connection body.

The second connection body may be fixed to the first connection body while being inserted therein.

Another aspect is a battery module comprising: a plurality of rechargeable batteries; a plurality of electrode tabs connecting the rechargeable batteries; a connection board electrically connecting the electrode tabs; and a connector connecting the connection board and a protection circuit board.

The above battery module further comprises a plurality of insertion protrusions protruding from the electrode tab to be connected to the connection board. In the above battery module, the insertion protrusions are welded to the connection board. In the above battery module, the connection board has a plurality of insertion holes formed therein so as to receive the insertion protrusions. In the above battery module, the connector comprises: a first connection portion provided in the protection circuit board; and a second connection portion provided in the connection board and connected to the first connection portion.

In the above battery module, the first connection portion comprises: a plurality of fixing pins inserted into the protection circuit board; and a first connection body connected to the fixing pins and extending in the direction of the height of the connection board. In the above battery module, the first connection body has a plurality of locking holes formed therein. In the above battery module, the second connection portion comprises a second connection body electrically connected to the connection board and the first connection body.

The above battery module further comprises a plurality of fixing protrusions protruding from a side surface of the second connection body and inserted into the locking holes. In the above battery module, the second connection body is inserted into the first connection body. In the above battery module, the rechargeable batteries are connected to each other in series, wherein each of the rechargeable batteries has bottom and top surfaces opposing each other, and wherein the connection board extends to cover at least two of the top or bottom surfaces of the rechargeable batteries.

In the above battery module, the connection board does not cover at least two of the top or bottom surfaces of the rechargeable batteries. In the above battery module, the connection board has a rectangular shape. In the above battery module, the connector is connected to an end portion of the connection board. In the above battery module, the connector and the protection circuit board are positioned with respect to each other at an angle. In the above battery module, the connector and the protection circuit board are perpendicular to each other.

Another aspect is a battery module comprising: a plurality of rechargeable batteries extending in a first direction; a protection circuit board configured to control the rechargeable batteries; a plurality of electrode tabs connecting the rechargeable batteries; a connection board electrically connecting the electrode tabs and extending in the first direction; and a connector connecting the connection board and the protection circuit board, wherein the connector extends in a second direction crossing the first direction.

In the above battery module, each of the rechargeable batteries has bottom and top surfaces opposing each other, and wherein the connection board extends to cover at least two of the top or bottom surfaces of the rechargeable batteries. In the above battery module, the connection board has a rectangular shape. In the above battery module, the connector is connected to an end portion of the connection board.

According to at least one of the disclosed embodiments, a process for manufacturing the battery module can be simplified and the connection board and the protection circuit board are connected by using the connector, and accordingly durability can be improved and material costs can be reduced by not using wires.

DETAILED DESCRIPTION OF CERTAIN INVENTIVE EMBODIMENTS

Generally, a battery module includes an electrode tab connecting rechargeable batteries and a balancing wire connecting the electrode tab to a protection circuit board. The balancing wire is connected to the protection circuit board while being fixed to an end of the electrode tab. However, when the balancing wire is connected to the electrode tab, the wire is pressed, thereby potentially causing a short-circuit by breakage. Further, the use of a balancing wire causes internal configurations of the battery module to become more complex, and this results in higher manufacturing costs.

Embodiments will be described more fully hereinafter with reference to the accompanying drawings. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. In this disclosure, the term "substantially" includes the meanings of completely, almost completely or to any significant degree under some applications and in accordance with those skilled in the art. Moreover, "formed, disposed over positioned over" can also mean "formed, disposed or positioned on." The term "connected" includes an electrical connection.

Figure 1:
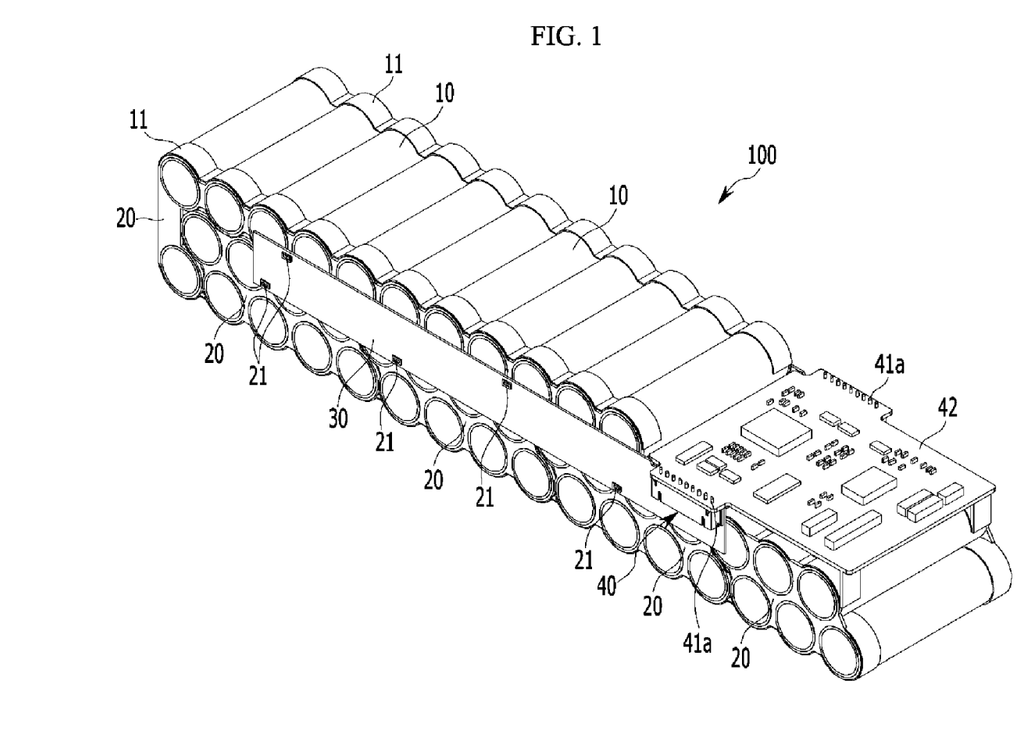
FIG. 1 is a perspective view of a battery module according to an exemplary embodiment.
Figure 2:
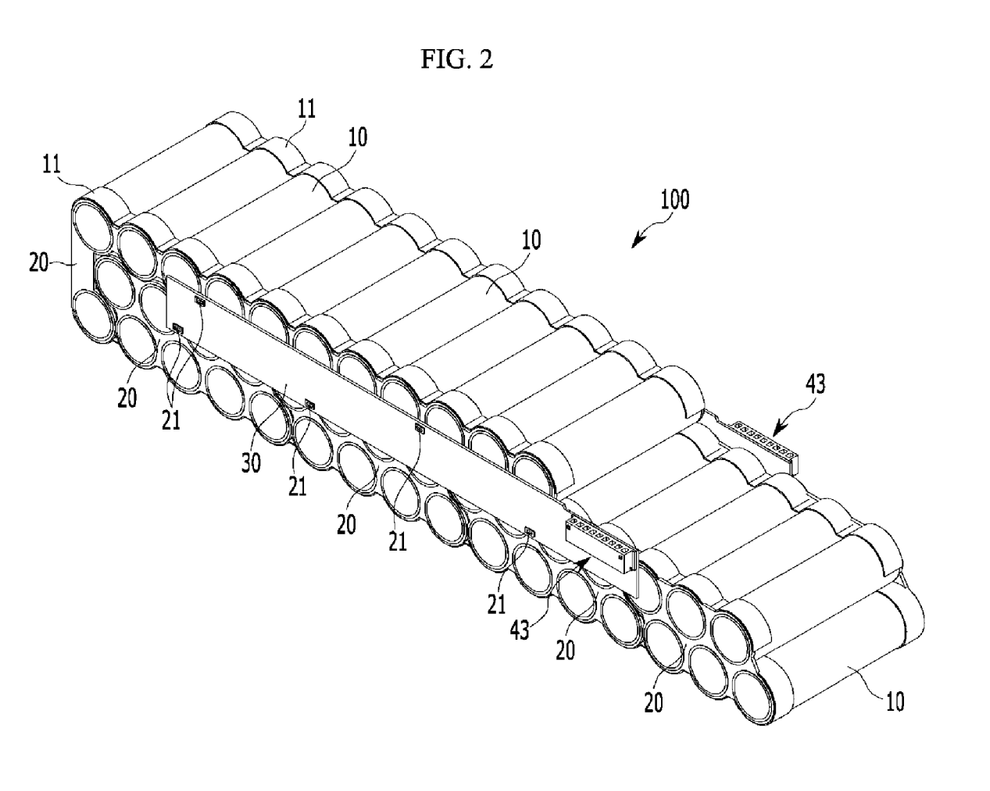
FIG. 2 is a schematic perspective view of FIG. 1 where a protection circuit board is being removed.

FIG. 1 is a perspective view of a battery module 100 according to an exemplary embodiment, and FIG. 2 is a perspective view of a state in which the protection circuit board of FIG. 1 is removed.

As shown in FIG. 1 and FIG. 2, the battery module 100 includes a plurality of rechargeable batteries 10, a plurality of electrode tabs 20 connecting the rechargeable batteries 10, a connection board 30 electrically connecting the electrode tabs 20, and a connector 40 connecting the connection board 30 and a protection circuit board 42.

The rechargeable battery 10 is provided as a cylindrical battery. The rechargeable batteries 10 are arranged to be adjacent to each other and then connected by the electrode tab 20. In the present exemplary embodiment, the rechargeable batteries 10 are fixed to holders 11 while being arranged in a plurality of columns and a plurality of rows.

In the arrangement of the rechargeable batteries 10, neighboring rechargeable batteries 10 may have opposite polarities. That is, negative polarities of rechargeable batteries 10 that neighbor rechargeable batteries 10 of which positive polarities are arranged in one direction may be disposed along one direction.

The rechargeable batteries 10 are connected to each other by the electrode tab 20.

The electrode tab 20 electrically connects at least two or more rechargeable batteries 10, and may be made of a highly conductive material such as nickel, aluminum, copper, or silver. The electrode tabs 20 may be disposed at side surfaces of the rechargeable batteries 10 while being adjacent to each other such that the rechargeable batteries 10 can be connected to each other. The electrode tabs 20 may be connected by the connection board 30.

Insertion protrusions 21 connected to the connection board 30 may protrude from the electrode tab 20.

At least one or more insertion protrusions 21 may be provided in side surfaces of the electrode tabs 20. Accordingly, the insertion protrusions 21 are fixed to the connection board 30 while being inserted therein, and thus the electrode tabs 20 and the connection board 30 can be more stably connected.

The connection board 30 may be provided to electrically connect the electrode tabs 20 that are provided in the side surfaces of the rechargeable batteries 10 so as to connect the rechargeable batteries 10.

The connection board 30 can be formed in the shape of a rectangular plate in the present exemplary embodiment, and connects the electrode tabs 20. However, the shape of the connection board 30 is not limited to the rectangular plate, and may be variously modified, for example, may have other polygonal shapes or may be at least partially rounded.

Figure 3:
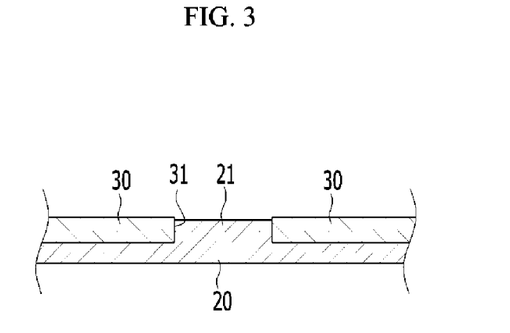
FIG. 3 is a schematic partial cross-sectional view of a state in which an insertion protrusion of an electrode tab is connected to a connection board.

FIG. 3 is a partial cross-sectional view of a state in which the insertion protrusions 21 of the electrode tabs 20 are connected to the connection board 30.

As shown in FIG. 3, insertion holes 31 may be provided in the connection board 30 for fixing the insertion protrusions 21 protruding from the electrode tabs 20.

The insertion holes 31 may penetrate the connection board 30 corresponding to the number of insertion protrusions 21. The insertion protrusion 31 may be fixed to the insertion hole 31 by being inserted therein. In the present exemplary embodiment, the insertion protrusion 21 is inserted into the insertion hole 31 and then fixed thereto by welding, but this is not restrictive. The insertion protrusion 21 may be press-fixed to the insertion hole 31.

The insertion protrusion 21 may be welded while being inserted into the insertion hole 31 of the connection board 30. Thus, the connection board can be more stably fixed to the electrode tab 20.

The connection board 30 is connected to the protection circuit board 42 by the connector 40.

Figure 4:
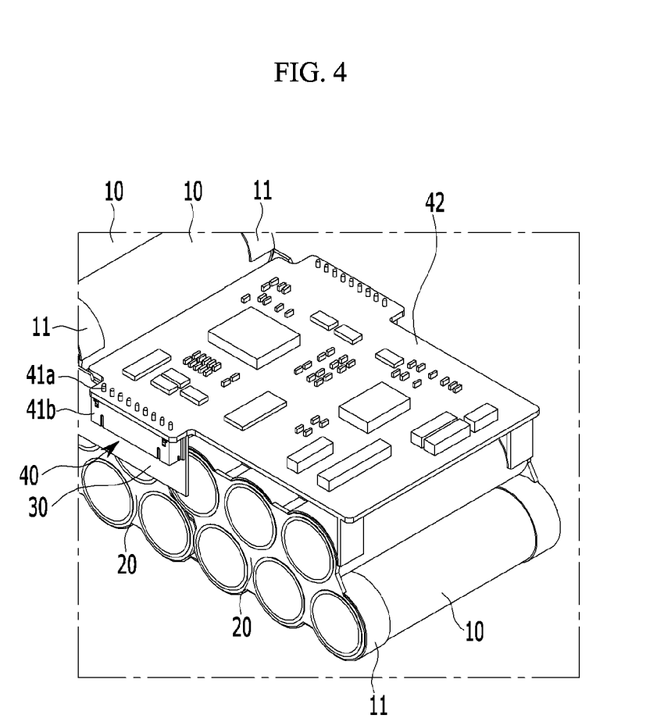
FIG. 4 is a partial perspective view of a state in which the connection board of the battery module and a protection circuit board of FIG. 1 are connected to a connector.
Figure 5:
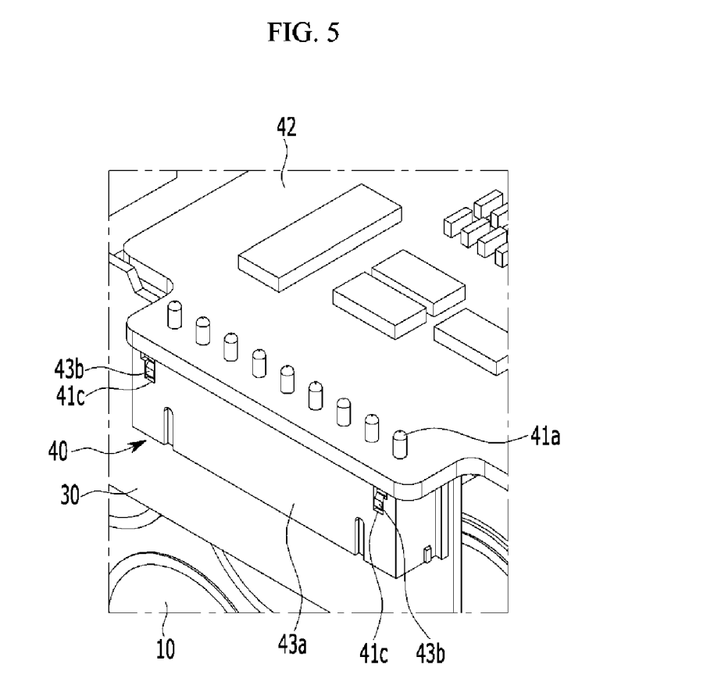
FIG. 5 is a partial perspective view of a state in which the connector of FIG. 4 is being connected.
Figure 6:
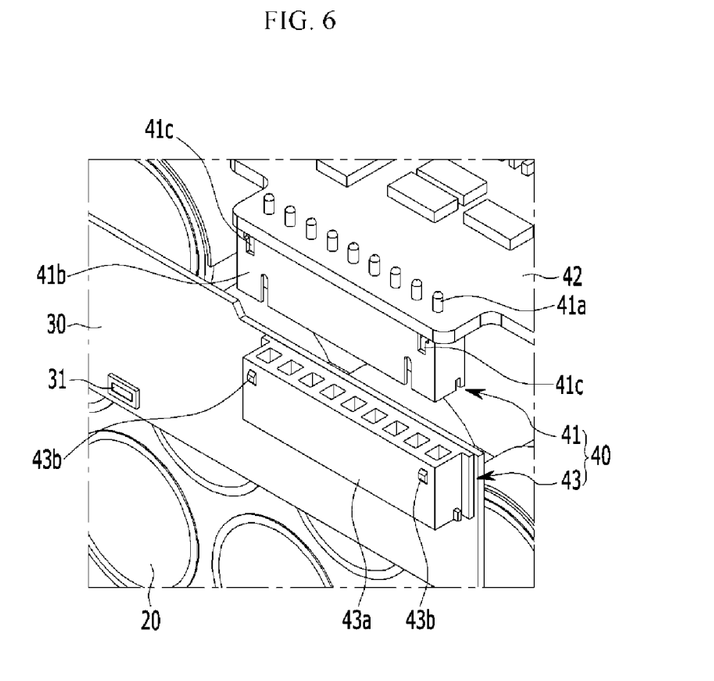
FIG. 6 is a schematic partial perspective view of a state in which the connector of FIG. 5 is separated into a first connection portion and a second connection portion.

FIG. 4 is a schematic partial perspective view of a state in which the connection board and the protection circuit board of the battery module of FIG. 1 are connected to the connector, FIG. 5 is a partial perspective view of a state in which the connector of FIG. 4 is connected, and FIG. 6 is a partial perspective view of a state in which the connector is separated into a first connection portion and a second connection portion.

As shown in FIG. 4 to FIG. 6, the connector 40 may include a first connection portion 41 provided in the protection circuit board 42 and a second connection portion 43 provided in the connection board 30 and connected to the first connection portion 41.

The first connection portion 41 may include a fixing pin 41a fixed to the protection circuit board 42 by being inserted therein and a first connection body 41b connected to the fixing pin 41a and protruding to a direction of the connection board 30.

The first connection body 41b may be connected to one side surface of the protection circuit board 42 while being protruded. The first connection body 41b can be formed in the shape of a quadrangular block and can protrude in the side surface of the protection circuit board 42.

The first connection body 41b may have an insertion space formed therein for connection with the second connection portion 43. A plurality of fixing pins 41a may protrude from a side surface of the first connection body 41b.

The fixing pins 41a may protrude from the first connection body 41b and then can be inserted to the protection circuit board 42. The fixing pins 41a may be arranged with a regular interval along a first direction. Alternatively, the fixing pins 41a may protrude to the outside of the first connection body 41b while being arranged in a plurality of columns and a plurality of rows. The fixing pin 41a can be fixed by soldering and the like while being inserted into the protection circuit board 42.

The insertion hole 31 in which the second connection portion 43 is inserted may be provided in the first connection body 41b. That is, the first connection body 41b can be formed as a socket type and connected to the second connection portion 43. A locking hole 41c may be provided in a side surface of the first connection body 41b so as to be connected to the second connection portion 43.

The locking hole 41c is provided in plural in a side surface of the first connection body 41b and fixing protrusions 43b of the second connection portion 43 can be fixed by being locked therein.

The second connection portion 43 may include a second connection body 43a electrically fixed to the connection board 30 and electrically connected to the first connection body 41b.

The second connection body 43a is electrically connected with the first connection body 41b, and may be connected to the first connection body 41b while being inserted to the insertion hole 31 formed in the first connection body 41b. That is, since the second connection body 43a is electrically connected to the first connection body 41b while being inserted therein, the connection board 30 and the protection circuit board 42 can be electrically connected.

The fixing protrusions 43b protrude from a side surface of the second connection body 43a.

As shown, two fixing protrusions 43b protrude at a distance from each other in the side surface of the second connection body 43a. As described, the fixing protrusions 43b protrude from the side surface of the second connection body 43a so as to be inserted in the insertion holes 31 while the first connection body 41b and the second connection body 43a are connected with each other to thereby more stably fix the first and second connection bodies 41b and 43a.

In the present exemplary embodiment, two fixing protrusions 43b protrude from the side surface of the second connection body 43a, but this is not restrictive. One or three or more fixing protrusions 43b may protrude from the side surface of the second connection body 43a. That is, the fixing protrusion 43b may protrude from the side surface of the second connection body 43a with a proper number corresponding to the size of the second connection body 43a.

An inclined surface is formed in the protruded side surface of the fixing protrusion 43b such that the fixing protrusions 43b can be smoothly inserted and then locked in the insertion hole 31 while the first connection body 41b and the second connection body 43a are being connected.

As described above, the electrode tabs 20 are electrically connected by the connection board 30 in the battery modules 100 of the present exemplary embodiment. Further, the connection board 30 can be electrically connected to the protection circuit board 42 by the connector 40.

Thus, conventionally (not necessarily prior art), the rechargeable battery and the protection circuit board are connected by wires, but the wires are not used in the present exemplary embodiment such that a process for manufacturing the battery module can be simplified and material costs can be reduced. Further, a probability of short-circuit in the wire in the conventional case can be prevented such that durability of the battery module can be improved.

While the inventive technology has been described in connection with exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module comprising:
a plurality of rechargeable batteries;
a plurality of electrode tabs connecting the rechargeable batteries, wherein at least one of the electrode tabs has first and second surfaces opposing each other, wherein the first surface includes a first portion and a second portion surrounding the first portion, and wherein at least one insertion protrusion extends from the first portion of the first surface of the electrode tab;
a connection board electrically connecting the electrode tabs and having at least one insertion hole formed therein, wherein the insertion protrusion is inserted into the insertion hole so as to contact an inner wall of the insertion hole, wherein the first surface of the electrode tab faces the connection board, wherein the second surface of the electrode tab faces the rechargeable batteries, and wherein at least part of the second portion of the first surface of the electrode tab is in direct physical contact with the connection board; and
a connector connecting the connection board and a protection circuit board.

2. The battery module of claim 1, wherein the least one insertion protrusion comprises a plurality of insertion protrusions, wherein the at least one insertion hole comprises a plurality of insertion holes, and wherein the insertion protrusions are respectively inserted into the insertion holes.

3. The battery module of claim 2, wherein the insertion protrusions are welded to the connection board.

4. The battery module of claim 1, wherein the connector comprises:
a first connection portion provided in the protection circuit board; and a second connection portion provided in the connection board and connected to the first connection portion.

5. The battery module of claim 4, wherein the first connection portion comprises:
   a plurality of fixing pins inserted into the protection circuit board; and
   a first connection body connected to the fixing pins and extending in the direction of the height of the connection board.

6. The battery module of claim 5, wherein the first connection body has a plurality of locking holes formed therein.

7. The battery module of claim 6, wherein the second connection portion comprises a second connection body electrically connected to the connection board and the first connection body.

8. The battery module of claim 7, further comprising a plurality of fixing protrusions protruding from a side surface of the second connection body and inserted into the locking holes.

9. The battery module of claim 7, wherein the second connection body is inserted into the first connection body.

10. The battery module of claim 1, wherein the rechargeable batteries are connected to each other in series, wherein each of the rechargeable batteries has bottom and top surfaces opposing each other, and wherein the connection board extends to cover at least two of the top or bottom surfaces of the rechargeable batteries.

11. The battery module of claim 10, wherein the connection board does not cover at least two of the top or bottom surfaces of the rechargeable batteries.

12. The battery module of claim 1, wherein the connection board has a rectangular shape.

13. The battery module of claim 1, wherein the connector is connected to an end portion of the connection board.

14. The battery module of claim 1, wherein the connector and the protection circuit board are positioned with respect to each other at an angle.

15. The battery module of claim 14, wherein the connector and the protection circuit board are perpendicular to each other.

16. A battery module comprising:
   a plurality of rechargeable batteries extending in a first direction;
   a protection circuit board configured to control the rechargeable batteries;
   a plurality of electrode tabs connecting the rechargeable batteries, wherein at least one of the electrode tabs has first and second surfaces opposing each other, wherein the first surface includes a first portion and a second portion surrounding the first portion, and wherein at least one insertion protrusion extends from the first portion of the first surface of the electrode tab;
   a connection board electrically connecting the electrode tabs and extending in the first direction, wherein the connection board has at least one insertion hole formed therein, wherein the insertion protrusion is inserted into the insertion hole so as to contact an inner wall of the insertion hole, wherein the first surface of the electrode tab faces the connection board, wherein the second surface of the electrode tab faces the rechargeable batteries, and wherein at least part of the second portion of the first surface of the electrode tab is in direct physical contact with the connection board; and
   a connector connecting the connection board and the protection circuit board, wherein the connector extends in a second direction crossing the first direction.

17. The battery module of claim 16, wherein each of the rechargeable batteries has bottom and top surfaces opposing each other, and wherein the connection board extends to cover at least two of the top or bottom surfaces of the rechargeable batteries.

18. The battery module of claim 16, wherein the connection board has a rectangular shape.

19. The battery module of claim 16, wherein the connector is connected to an end portion of the connection board.

20. The battery module of claim 1, wherein no throughhole is formed in the insertion protrusion.

* * * * *